US009989117B2

(12) United States Patent
Baumgartner et al.

(10) Patent No.: US 9,989,117 B2
(45) Date of Patent: Jun. 5, 2018

(54) DISC BRAKE HAVING A BIDIRECTIONAL WEAR ADJUSTMENT DEVICE AND BIDIRECTIONAL WEAR ADJUSTMENT DEVICE

(71) Applicant: KNORR-BREMSE Systeme fuer Nutzfahrzeuge GmbH, Munich (DE)

(72) Inventors: Johann Baumgartner, Moosburg (DE); Robert Trimpe, Wessling (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 185 days.

(21) Appl. No.: 14/885,206

(22) Filed: Oct. 16, 2015

(65) Prior Publication Data
US 2016/0032996 A1 Feb. 4, 2016

Related U.S. Application Data

(63) Continuation of application No. PCT/EP2014/057574, filed on Apr. 15, 2014.

(30) Foreign Application Priority Data

Apr. 19, 2013 (DE) .................. 10 2013 006 863

(51) Int. Cl.
*F16D 65/66* (2006.01)
*F16D 65/12* (2006.01)
(Continued)

(52) U.S. Cl.
CPC ........... *F16D 65/66* (2013.01); *F16D 55/225* (2013.01); *F16D 65/12* (2013.01); *F16D 65/568* (2013.01); *F16D 2129/04* (2013.01)

(58) Field of Classification Search
CPC ........ F16D 65/66; F16D 65/12; F16D 65/568; F16D 55/225
See application file for complete search history.

(56) References Cited

U.S. PATENT DOCUMENTS 6,250,434 B1 * 6/2001 Baumgartner ........ F16D 65/568
188/196 R
7,926,626 B2 4/2011 Iraschko
(Continued)

FOREIGN PATENT DOCUMENTS

DE 197 29 024 C1 1/1999
DE 197 31 696 A1 2/1999
(Continued)

OTHER PUBLICATIONS

International Search Report (PCT/ISA/210) issued in PCT Application No. PCT/EP2014/057574 dated Jun. 3, 2015 with English translation (five pages).
(Continued)

*Primary Examiner* — Vishal R Sahni
(74) *Attorney, Agent, or Firm* — Crowell & Moring LLP

(57) ABSTRACT

A disc brake, in particular for a motor vehicle, has a brake application device, preferably with a brake rotary lever, at least one spindle unit having at least one threaded tube with an external thread that cooperates with an internal thread of a bridge, and at least one bidirectional wear adjustment device which is coupled to the brake application device, preferably to the brake rotary lever. The bidirectional wear adjustment device has an adjustment arrangement and at least one preloading arrangement which is designed to influence a flank position of a thread pairing of the external thread of the at least one threaded tube and the associated internal thread of the bridge.

18 Claims, 5 Drawing Sheets

(51) Int. Cl.
*F16D 65/56* (2006.01)
*F16D 55/225* (2006.01)
F16D 129/04 (2012.01)

(56) References Cited

U.S. PATENT DOCUMENTS

| | | | | |
|---|---|---|---|---|
| 2003/0029684 A1* | 2/2003 | Forster | ............... | F16F 9/3214 |
| | | | | 188/282.5 |
| 2007/0209890 A1* | 9/2007 | Iraschko | ............... | F16D 65/567 |
| | | | | 188/203 |
| 2011/0203882 A1* | 8/2011 | Iraschko | ............... | F16D 65/568 |
| | | | | 188/71.7 |

FOREIGN PATENT DOCUMENTS

| | | |
|---|---|---|
| DE | 10 2004 037 771 A1 | 3/2006 |
| DE | 10 2012 102 577 A1 | 9/2013 |
| DE | 10 2012 012 473 A1 | 12/2013 |
| EP | 1 776 531 B1 | 3/2008 |
| GB | 2 332 027 A | 6/1999 |

OTHER PUBLICATIONS

German Office Action issued in counterpart German Application No. 10 2013 006 863.0 dated Nov. 18, 2013 (seven pages).
International Preliminary Report on Patentability with Written Opinion (PCT/IB373 & PCT/ISA/237) dated Oct. 20, 2015 (Seven (7) pages).

* cited by examiner

DISC BRAKE HAVING A BIDIRECTIONAL WEAR ADJUSTMENT DEVICE AND BIDIRECTIONAL WEAR ADJUSTMENT DEVICE

CROSS REFERENCE TO RELATED APPLICATIONS

This application is a continuation of PCT International Application No. PCT/EP2014/057574, filed Apr. 15, 2014, which claims priority under 35 U.S.C. § 119 from German Patent Application No. 10 2013 006 863.0, filed Apr. 19, 2013, the entire disclosures of which are herein expressly incorporated by reference.

BACKGROUND AND SUMMARY OF THE INVENTION

The invention relates to a disc brake, in particular for a motor vehicle, comprising a bidirectional wear adjustment device coupled to a brake application device, as well as to the bidirectional wear adjustment device.

Vehicles and certain technical equipment often use friction brakes to convert kinetic energy. Disc brakes are preferred here, especially in the passenger car and commercial vehicle sectors. With the typical design of a disc brake, said disc brake comprises a brake caliper together with an internal mechanism, generally comprising two brake pads and the brake disc. Brake cylinder forces are introduced into the internal mechanism via a pneumatically actuated cylinder, are multiplied by an eccentric mechanism, and are transmitted as a brake application force to the brake pads and the brake disc via threaded tubes, which are also referred to as threaded plungers or threaded spindles, with the wear on the brake disc and the brake pads being compensated by way of the threaded tubes.

The brake application forces act via both brake pads on the brake disc, which undergoes retardation of the rotary motion depending on the level of the brake application force. A clearance between the brake pads and the brake disc is referred to as a release clearance (or gap). The retardation is significantly affected by the friction coefficient between the brake disc and the brake pad. Since the pads are designed as parts that wear out and the friction coefficients are dependent on rigidity, these pads are generally softer than the brake disc, i.e. the pads undergo a change in pad thickness over their time in use: they wear. Owing to this pad wear and additional disc wear, said release clearance increases. This change in pad thickness gives rise to the need for wear adjustment to compensate for the change and thus establish a constant release clearance.

One example of an adjustment device is described in DE 10 2004 037 771 A1. Here, a rotary driving motion is transmitted to an adjusting spindle of a plunger, e.g. by a torque limiting device, having a ball ramp for example, via a continuously acting clutch (slipping clutch). Here, the release clearance is adjusted continuously.

Bidirectionally acting brake release clearance adjusting arrangements are furthermore known in various embodiments, e.g. electric-motor-driven and electronically controlled adjustment devices, which can increase and reduce a brake release clearance as desired and act only in nonbraking phases. One example that may be mentioned for illustration purposes is DE 197 31 696.

Examples of mechanically driven and mechanically acting combined adjustment and return devices which can increase and reduce the release clearance in steps during brake actuations are described by DE 10 2012 012 473 and DE 10 2012 102 577, for example.

Other mechanically driven and mechanically acting adjustment devices can reduce an enlarged release clearance during brake actuations. In the case of an unwanted reduction in the release clearance below the desired value, they exploit existing return rotation effects on the actuating spindles in order to increase the release clearance in very small steps. When the desired value is reached, further reverse rotation movement is stopped by the locking effect of the adjuster. This effect is potentially included in all known mechanically acting adjustment systems but is generally suppressed by high holding friction torques at the adjuster and/or at the spindle system in order to avoid unwanted changes in the release clearance, e.g. due to the effects of vibration.

In contrast to the bidirectional adjuster concepts described above, reductions in the release clearance occurring spontaneously in the last example can only be eliminated with a very large number of brake actuations. Such spontaneously occurring reductions in release clearance can be brought about by the following events, for example: severe vibrational stress occurring between two braking operations, incorrect release clearance adjustment, high-energy braking operations with a large increase in thickness of the brake disc and the brake pads, etc.

The object of the present invention consists in providing an improved disc brake having a bidirectional wear adjustment device.

Another object is to provide an improved wear adjustment device.

These and other objects are achieved according to the invention by a disc brake, preferably pneumatic, in particular for a motor vehicle, including a brake application device, preferably with a pivoted brake lever, at least one spindle unit having at least one threaded tube with an external thread cooperating with an internal thread of a bridge, and at least one bidirectional wear adjustment device, which is coupled to the brake application device, preferably to the pivoted brake lever. The bidirectional wear adjustment device includes an adjusting arrangement and at least one preloading arrangement, wherein the preloading arrangement is designed to influence a flank position of a thread pairing of the external thread of the at least one threaded tube and the associated internal thread of the bridge.

As compared with the prior art, the disc brake according to the invention with the bidirectional wear adjustment device has the advantage that an increased return speed of the bidirectional wear adjustment device and improved resistance to wear and the effect of vibration are provided.

Another advantage is that an already existing adjusting arrangement can be used. The reverse rotary motion of the threaded tubes is made possible and vibration resistance which is still adequate is ensured.

In one embodiment, the at least one preloading arrangement is designed to adjust a flank position of the external thread of the at least one threaded tube and of the associated internal thread of the bridge from a rest position in a state of release of the disc brake into a reverse rotation position with a reduced reverse rotation resistance of the thread pairing of the external thread of the at least one threaded tube and of the associated internal thread of the bridge during an application process of the disc brake. In this way, a reliable holding effect for the thread pairing in the rest position can be ensured, while reverse rotation resistance in the reverse rotation position can simultaneously be reduced.

The rest position should be taken to mean the position or location of the disc brake in which the disc brake is not actuated, i.e. is released. In the rest position, a center line of an internal thread of the bridge and a threaded tube axis of the threaded tube associated with said internal thread are spaced apart. That is to say, on one longitudinal side, the thread flanks of the thread pairing are backlash-free in a contact region and, on the opposite longitudinal side, there is the full thread backlash of the thread pairing.

The reverse rotation position is the position which is adopted by the at least one threaded tube when the disc brake is actuated until the brake pads rest against the brake disc, in other words during an application process of the disc brake. During this process, the center line of the internal thread of the bridge and the threaded tube axis of the threaded tube associated with said internal thread come into a position in which they coincide.

In another embodiment, the at least one preloading arrangement is designed to produce a preloading force, which acts radially on the at least one threaded tube. In tests, it has surprisingly been found that a transverse displacement of a rotatable cylindrical body which rests by means of a friction surface on a bearing surface reduces the frictional resistance of the friction surface on the bearing surface at a given axial force.

It is advantageous here if the radially acting preloading force is an elastically acting preloading force. For this purpose, the at least one preloading arrangement for producing the radially acting preloading force can have at least one energy storage element, e.g. a compression spring. Other energy storage elements are, of course, also possible, e.g. pneumatic, hydraulic, electromagnetic energy storage elements. It is particularly advantageous here if these energy storage elements are controllable, e.g. controllable gas pressure springs.

In another embodiment, the at least one preloading arrangement has at least one release mechanism, which is designed to reduce the reverse rotation resistance or holding forces of the thread pairing of the external thread of the at least one threaded tube and of the associated internal thread of the bridge during an application process of the disc brake in the reverse rotation position. Controllable adjustment of the rest position and the reverse rotation position is thereby possible. For example, two preloading arrangements arranged opposite one another can be used, wherein the first preloading arrangement is active for the adoption of the rest position. For the adoption of the reverse rotation position, the other preloading arrangement is activated and cancels out the effect of the force of the first preloading arrangement to such an extent that adoption of the reverse rotation position is ensured.

In this phase of the radially inward sliding of the threaded tube due to the slope of the thread flanks, the friction at the thread flanks in a tangential direction is also overcome, as a result of which the reverse rotation torque brought about by the thread slope by means of the loading force which builds up overcomes the frictional resistance and brings about a reverse rotation of the threaded tube during the radial sliding phase of said tube.

In yet another embodiment, the adjusting arrangement has a selector fork connected to a driving element, wherein the selector fork is provided for interaction with an actuator of the brake application device, preferably with the pivoted brake lever. The selector fork and the actuator thus form a stop for the resetting of the release clearance to the desired value of the design release clearance, which can be mechanically defined by the selector fork.

In another embodiment, the adjusting arrangement has a freewheeling and overload clutch arrangement, which interacts with the driving element. This ensures that the operation of the adjusting arrangement for adjusting the release clearance is maintained.

In yet another embodiment, the adjusting arrangement is inserted into the at least one threaded tube of the at least one spindle unit, thus saving space. Here, the adjusting arrangement is accommodated without backlash by means of its output toothing in an internal tooth profile of the associated threaded tube (separation of sleeve and star). Reliable transmission of the reverse rotary motion of the threaded tubes to the adjusting arrangement is thereby made possible.

In another embodiment, the adjusting arrangement has an optimized head friction torque, thereby making resetting easier. At the same time, high robustness and vibration stability are ensured.

A bidirectional wear adjustment device comprising an adjusting arrangement and at least one preloading arrangement is provided by the disc brake described above.

One particular advantage is that, with an appropriate flank angle α of the threaded tubes, a high holding torque is achieved at the threaded tubes with a relatively low radial stress in the rest position, and this holding torque is automatically eliminated by a "flank sliding effect" when the disc brake is actuated.

Another advantage is that the threaded tubes are held in a stable position in the rest position by the lateral pressure of the external threads of the threaded tube against the respective internal thread of the bridge, even under severe vibrational loading, and thus relative movements of the external threads of the threaded tubes with respect to the internal thread of the bridge, which can be the cause of unwanted changes in the release clearance, are avoided.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
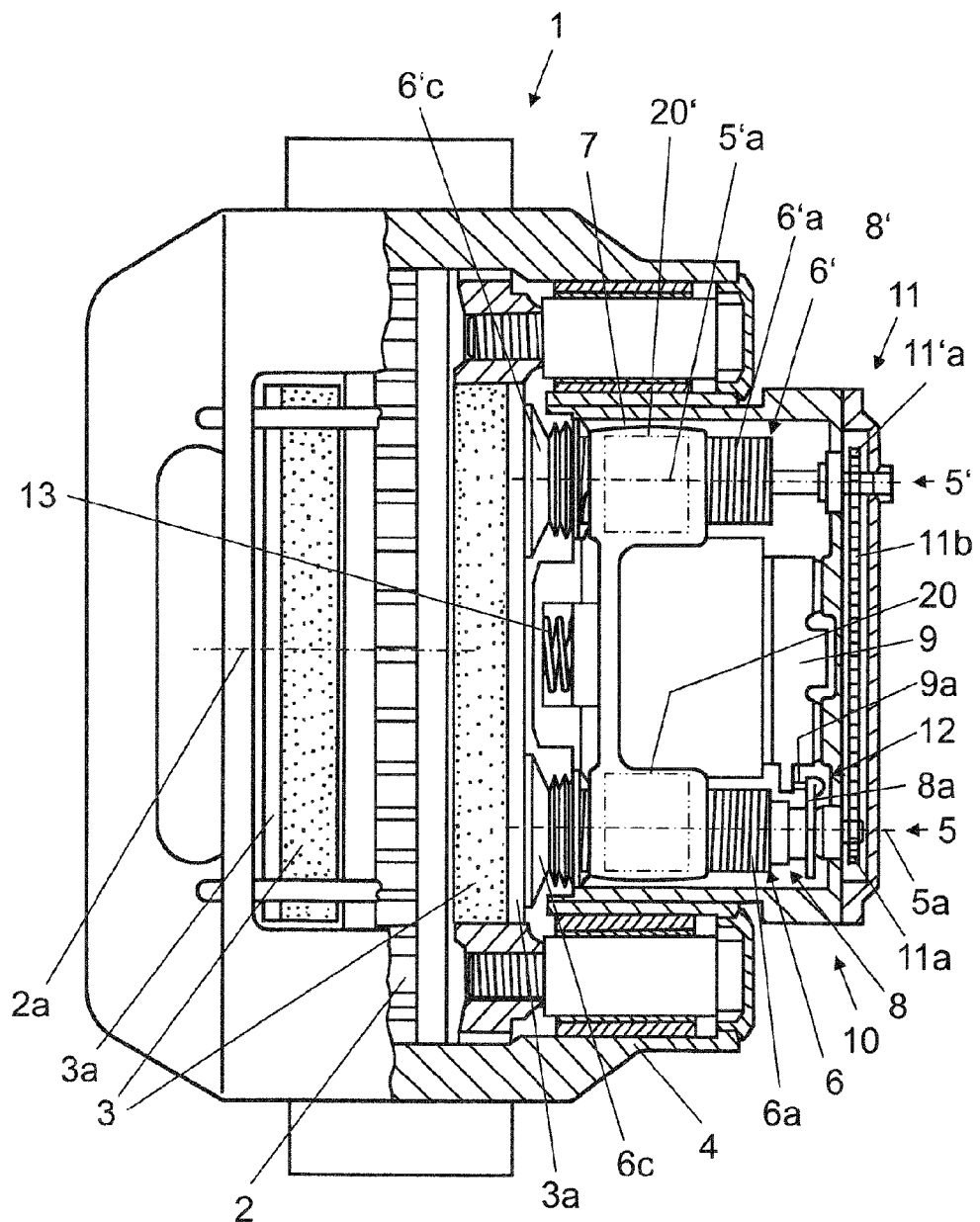
FIG. 1 is a schematic partially sectioned view of an illustrative embodiment of a disc brake according to the invention having a wear adjustment device according to the invention.

FIG. 1 shows a schematic partially sectioned view of an illustrative embodiment of a disc brake 1 according to the invention in a plan view, having a wear adjustment device 10 according to the invention.

The disc brake 1 has a brake disc 2 having a brake disc axis 2a. A brake caliper 4, here embodied as a floating caliper, fits over the brake disc 2. Respective brake pads 3, each having a brake pad support 3a, are arranged on each side of the brake disc 2. Here, the disc brake 1 is designed as a dual-plunger brake having two spindle units 5 and 5', each with a threaded tube 6, 6'. The threaded tubes 6, 6' can also be referred to as threaded plungers or threaded spindles. The side of the disc brake 1 on the right in FIG. 1 is referred to as the brake application side, and the side on the left is referred to as the pad well side.

The brake pad support 3a on the brake application side is connected to the spindle units 5, 5' at ends of the threaded tubes 6, 6' by way of pressure pieces 6c, 6'c. The other brake pad 3 with its brake pad support 3a is also referred to as the reaction-side brake pad 3 and is fixed in the brake caliper 4 by means of its brake pad support 3a on the other side of the brake disc 2. The threaded tubes 6, 6' each have an external thread 6a, 6'a and are each arranged rotatably in associated internal threads 7a in a bridge 7 (see FIG. 5). The bridge 7 is also referred to as a cross piece.

The bridge 7 and thus the threaded tubes 6, 6' can be actuated by a brake application device, in this case a pivoted (rotary) brake lever 9 with a pivoting axis at right angles to the brake disc axis 2a. The pivoted brake lever 9 has a lever body (not denoted specifically) which is in interaction with the bridge 7.

The bridge 7 can be adjusted in the direction of the brake disc axis 2a by the pivoted brake lever 9. A movement toward the brake disc 2 is referred to as a brake application movement, and a movement in the opposite direction is referred to as a release movement. A return spring 13 is accommodated in a corresponding recess in the middle of the bridge 7 on the pad side of the bridge 7 and is supported on the brake caliper 4. During the release movement, the bridge 7 is adjusted back into the released position of the disc brake 1 shown in FIG. 1 by means of the return spring 13.

A clearance between the brake pads 3 and the brake disc 2 in the released position is referred to as the release clearance. This release clearance increases as a result of pad and disc wear. If this is not compensated, the disc brake 1 cannot achieve its peak performance since an actuating stroke of the actuating mechanism, i.e. in this case the actuating stroke or a pivoting angle of the pivoted brake lever 9, is no longer sufficient.

The disc brake 1 can have different power operating mechanisms. Here, for example, the pivoted brake lever 9 is actuated pneumatically. For details of the construction and operation of a pneumatic disc brake 1, attention is drawn to the corresponding description of DE 197 29 024 C1.

The wear adjustment device 10 is designed for bidirectional adjustment of a predefined release clearance, which is referred to as the nominal release clearance. Here, bidirectional adjustment means that the wear adjustment device 10 can perform both follow-up adjustment and reverse adjustment of the release clearance.

The term "follow-up adjustment" should be taken to mean a reduction of the release clearance. The predefined release clearance is determined by the geometry of the disc brake 1 and has a "design release clearance". In other words, the wear adjustment device 10 reduces an existing release clearance to the desired value for the predefined release clearance if the existing release clearance is too large in relation to the predefined release clearance.

The term "reverse adjustment" refers to increasing the release clearance. During this process, a release clearance, the current value of which is less than the desired value for the predefined release clearance, is increased again. This will be described in greater detail below.

Here, the wear adjustment device 10 comprises an adjusting arrangement 8, a driver 8' and at least one preloading arrangement 20, 20'. In an embodiment having just one spindle unit 5, which is not shown here but is easily imagined, the wear adjustment device 10 comprises the adjusting arrangement 8 and at least one preloading arrangement 20, 20'.

The adjusting arrangement 8 is arranged on one spindle unit 5, coaxially with respect to the latter, to the threaded tube 6 thereof and to an adjuster axis 5a. In this illustrative embodiment, the adjusting arrangement 8 can be inserted into the threaded tubes 6. The adjusting arrangement 8 is supported in or inserted into the brake caliper 4 in a manner not explained in detail. A detailed description of this can be found in document DE 10 2004 037 771 A1, having U.S. counterpart publication US 2007/0209890 A1, the content of which is incorporated here by reference.

The driver 8' is arranged coaxially with the other spindle unit 5', with the threaded tube 6' thereof and with a driver axis 5'a. Here, the driver 8' is inserted into threaded tube 6' and is in operative connection therewith.

The adjuster axis 5a, the driver axis 5'a and the brake disc axis 2a are arranged parallel to one another.

The adjusting arrangement 8 of the wear adjustment device 10 interacts with the pivoted brake lever 9 via a drive 12. The drive 12 comprises an actuator 9a, which is connected to the pivoted brake lever 9, and a driving element 8a of the adjusting arrangement 8.

The at least one preloading arrangement 20, 20' is provided for interaction with at least one of the two threaded tubes 6, 6' and serves to produce a preloading force, which acts on at least one of the two threaded tubes 6, 6'. This is explained in detail below.

The adjusting arrangement 8 and the driver 8' are coupled in such a way by a synchronization unit 11 that a rotary motion of threaded tube 6 about the adjuster axis 5a brings about a rotary motion of threaded tube 6' about the driver axis 5'a and vice versa. Here, the synchronization unit 11 is arranged on a brake application-side upper side of the brake caliper 4 and is covered by a cover. Here, the synchronization unit 11 includes a synchronizing wheel 11a, which is coupled to the threaded tube 6 of one spindle unit 5 and to the adjuster 8, another synchronizing wheel 11'a, which is coupled to the threaded tube 6' of the other spindle unit 5' and to the driver 8', and a synchronizing mechanism 11b, by means of which the synchronizing wheels 11a and 11'a are coupled. In this illustrative embodiment, the synchronizing wheels 11a, 11'a are chain wheels and the synchronizing mechanism 11b is a chain. Synchronous movement of the threaded tubes 6, 6' of spindle units 5 and 5' during follow-up and reverse adjustment processes (driving by the adjusting arrangement 8) and adjustments during maintenance work, e.g. brake pad changes, (manual driving, e.g. by way of an actuating end of the driver 8' and/or a driving portion 8g of the adjusting arrangement 8 (see FIG. 2) is thus ensured.

Figure 2:
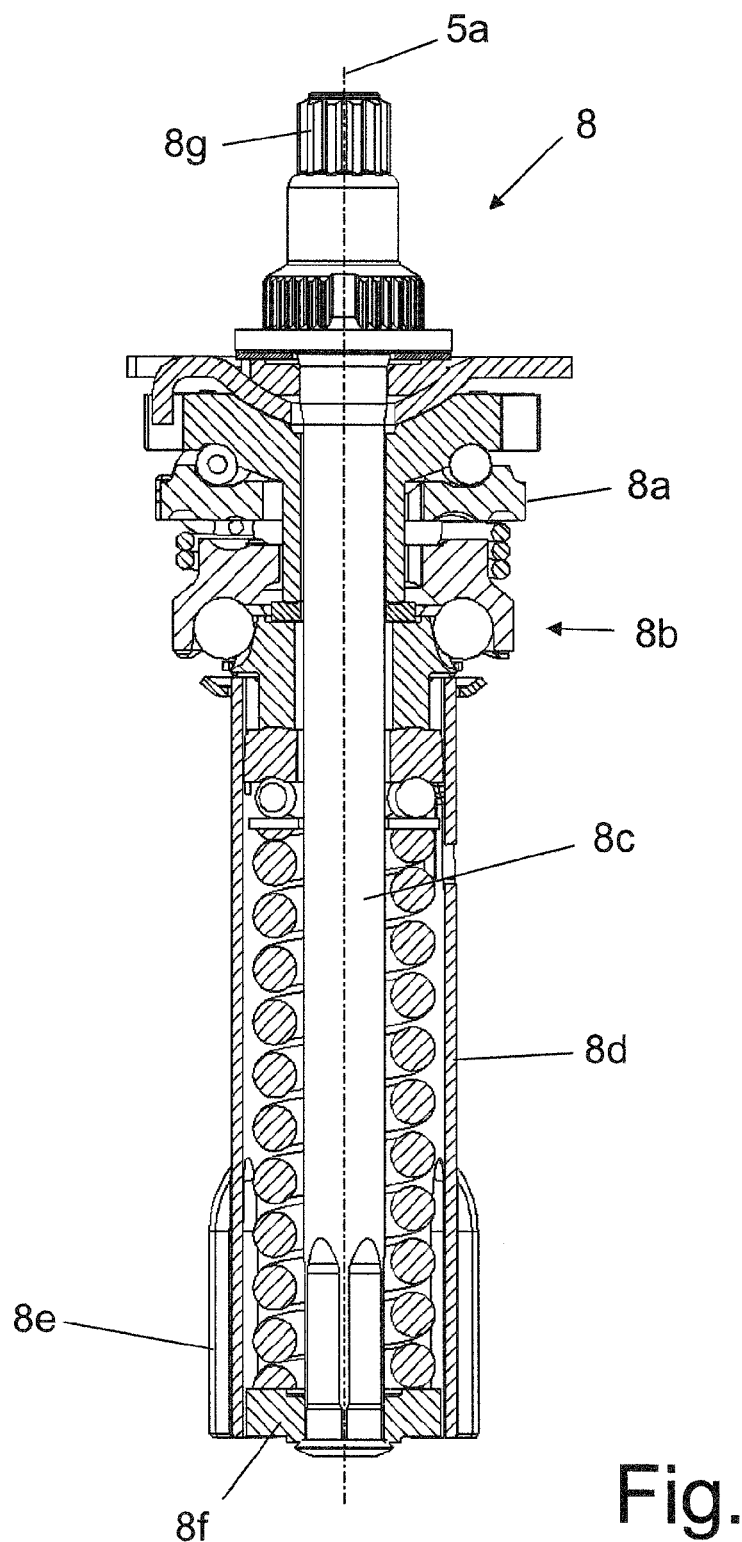
FIG. 2 is a schematic longitudinally sectioned view of an adjusting arrangement of the disc brake according to FIG. 1.

A schematic longitudinally sectioned view of the adjusting arrangement 8 of the disc brake 1 according to FIG. 1 is shown in FIG. 2.

The adjusting arrangement 8 has a central adjuster shaft 8c with the driving portion 8g at an upper, brake-application end. Here, the driving portion 8g is provided with a tool application feature (not denoted specifically). Situated under the latter is a shoulder having splines for coupling to the synchronizing wheel 11a (not shown here; see FIG. 1). Arranged under these splines is a collar of the adjuster shaft 8c, which rests on a spherical washer, which is supported in a bearing washer arranged thereunder. The bearing washer rests on a collar-type bushing, to which the bearing washer is non-rotatably connected in a manner not indicated specifically. These components are arranged around the adjuster shaft 8c and are not denoted specifically. The operation thereof can be found in document DE 10 2004 037 771 A1.

The following components are furthermore arranged in succession from the adjuster shaft 8c, around the latter: the driving element 8a, a freewheeling and overload clutch arrangement 8b and a sleeve 8d. The adjuster shaft 8c extends through the sleeve 8d as far as the end of the sleeve 8d shown at the bottom in FIG. 2 and through a compression spring arranged in said sleeve. The compression spring rests on a coupling element 8f secured on a lower end of the adjuster shaft 8c. The coupling element 8f is coupled non-rotatably to a lower portion of the inner side of the sleeve 8d. The lower outer segment of the sleeve 8d is provided with adjuster output elements 8e arranged on its circumference in a kind of tooth shape.

The pivoted brake lever 9 is coupled via the actuator 9a (also referred to as a lever pin) to the driving element 8a, which is also referred to as a selector fork. The actuator 9a and the driving element 8a form the drive 12 (see FIG. 1) of the adjusting arrangement 8 and thus of the wear adjustment device 10.

In the case of a wear adjustment, a driving movement of the adjusting arrangement 11 to the driving element 8a via the actuator 9a is transmitted by components and functional groups of the freewheeling and overload clutch arrangement 8b (which are not denoted specifically) to the sleeve 8d with the adjuster output elements 8e. For a further description of the components and functional groups of the freewheeling and overload clutch arrangement 8b, attention is drawn to document DE 10 2004 037 771 A1.

The adjusting arrangement 8 is inserted into threaded tube 6 and interacts with threaded tube 6 by means of the adjuster output elements 8e, which are coupled for conjoint rotation and without play to corresponding receptacles of an internal tooth profile within threaded tube 6.

Figure 3:
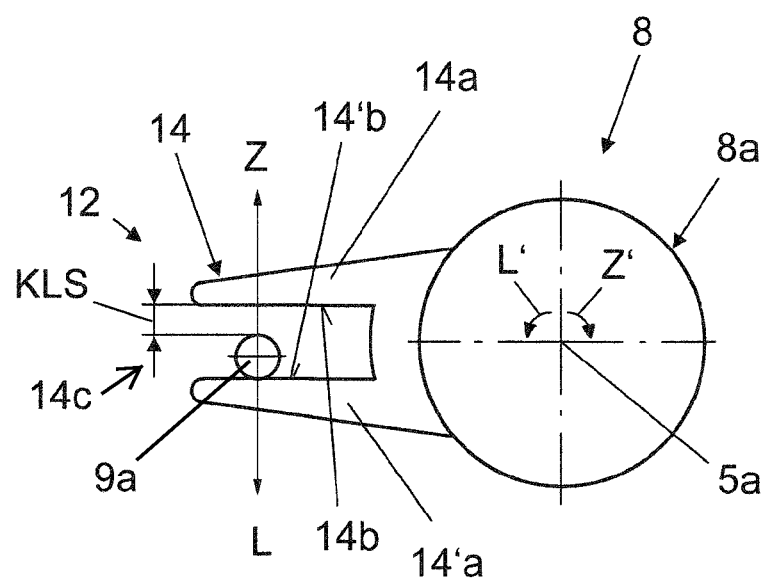
FIG. 3 is a schematic plan view of a drive of the adjusting arrangement according to FIG. 2.

A schematic plan view of the drive 12 of the adjusting arrangement 8 according to FIG. 2 is shown in FIG. 3.

The driving element 8a is designed as a selector fork 14. The selector fork 14 has a driving finger 14a and a rest finger 14'a as fork arms, which extend radially outward from the adjuster axis 5a and are spaced apart. Inner flanks 14b and 14'b, namely the inner flank 14b of the driving finger 14a and the inner flank 14'b of the rest finger 14'a form a fork opening 14c of the selector fork 14. Here, the inner flanks 14b and 14'b are arranged parallel to one another.

The actuator 9a of the pivoted brake lever 9 is arranged within the fork opening 1c. The actuator 9a and the selector fork 14 form the drive 12 of the adjusting arrangement 8. The actuator 9a is a pin (or cam, tooth or the like) of circular cross section, for example. Here, a diameter of the actuator 9a is smaller than a width of the fork opening 14c. This is illustrated only schematically. FIG. 3 shows a rest position or unactuated position of the disc brake 1, i.e. the disc brake 1 is released. In this position, the actuator 9a is in contact with one side of the inner flank 14'b of the rest finger 14'a.

When the pivoted brake lever 9 is pivoted, the actuator 9a firmly connected to the pivoted brake lever 9 moves on a circumferential segment of a circle which, when projected onto the plane of the drawing, gives a straight line, here indicated by two arrows. When the disc brake 1 is applied, the actuator 9a moves in direction Z. During this process, the actuator 9a moves out of contact with the inner flank 14'b of the rest finger 14'a and, initially, traverses a path corresponding to a clearance KLS before it comes into contact with the opposite inner flank 14b of the driving finger 14a of the selector fork 14. This clearance KLS is also referred to as the design release clearance. As brake application continues, i.e. as the pivoted brake lever 9 is pivoted further, the actuator 9a pivots the selector fork 14 and thus the driving element 8a in a pivoting motion in direction Z' (in this case clockwise) about the adjuster axis 5a for wear adjustment.

When the disc brake 1 is released, the pivoted brake lever 9 pivots with the actuator 9a in the opposite direction, which is indicated here by the letter L. During this process, the actuator 9a comes back into contact with the inner flank 14'b of the rest finger 14'a and guides the selector fork 14 and thus the driving element 8a back into the rest position shown in FIG. 3 in a pivoting motion in the direction L'. The pivoting motion L' of the driving element 8a takes place in the opposite direction to pivoting motion Z'.

In the illustrative embodiment of the wear adjustment device 10 according to the invention, the selector fork 14 of the driving element 8a of the adjusting arrangement 8 has further functions, which are described below with an explanation of the operation of the wear adjustment device 10 according to the invention.

At the beginning of a brake actuation, i.e. when the disc brake 1 is applied, the threaded tubes 6, 6' undergo transverse movements relative to the internal thread 7, 7'a, which can also be referred to as a nut thread, of the bridge 7 as the pressure pieces 6c, 6'c (FIG. 1) are applied to the brake pad support 3a by means of the brake pads 3. As a result, a thread friction between the external threads 6a, 6'a of the threaded tubes 6, 6' and the internal threads 7, 7'a in the tangential direction is temporarily eliminated. This is also explained in greater detail below in connection with FIG. 5.

During the loading force buildup which now begins, this temporary absence of thread friction allows a slight reverse rotation of the threaded tubes 6, 6' owing to the axial force acting. The amount of such a reverse adjustment motion is of the order of about <10 μm.

This reverse rotary motion produced in this way is then transmitted by the threaded tubes 6, 6' to the adjusting arrangement 8 by means of the adjuster output elements 8e and the driver, which is likewise provided with similar output elements.

In the case of a reduced release clearance, the actuator 9a (see FIG. 3) has not yet reached the inner flank 14b of the driving finger 14a of the selector fork 14 of the driving element 8a of the adjusting arrangement 8 in this state of application of the pressure pieces 6c, 6'c. By means of the reverse rotary motion in direction L' of the entire adjusting arrangement 8, the selector fork 14 of the driving element 8a is now pivoted toward the actuator 9a by a corresponding small angular step (in direction L').

This process is repeated during subsequent brake actuations until the selector fork 14 comes to rest on the actuator 9a by means of the inner flank 14b of the driving finger 14a right at the beginning of the reverse rotary motion in direction L'.

The pivoted brake lever 9 then blocks further reverse rotary motion by way of the actuator 9a and the locking effect of the freewheeling and overload clutch arrangement 8b of the adjusting arrangement 8.

In this way, an increase in the release clearance to the desired value of the release clearance is achieved by means of this "reverse adjustment" if the release clearance is too small.

The abovementioned elimination of the thread friction is described in detail below. In this connection, FIG. 4 shows a schematic illustration of a test setup.

Figure 4:
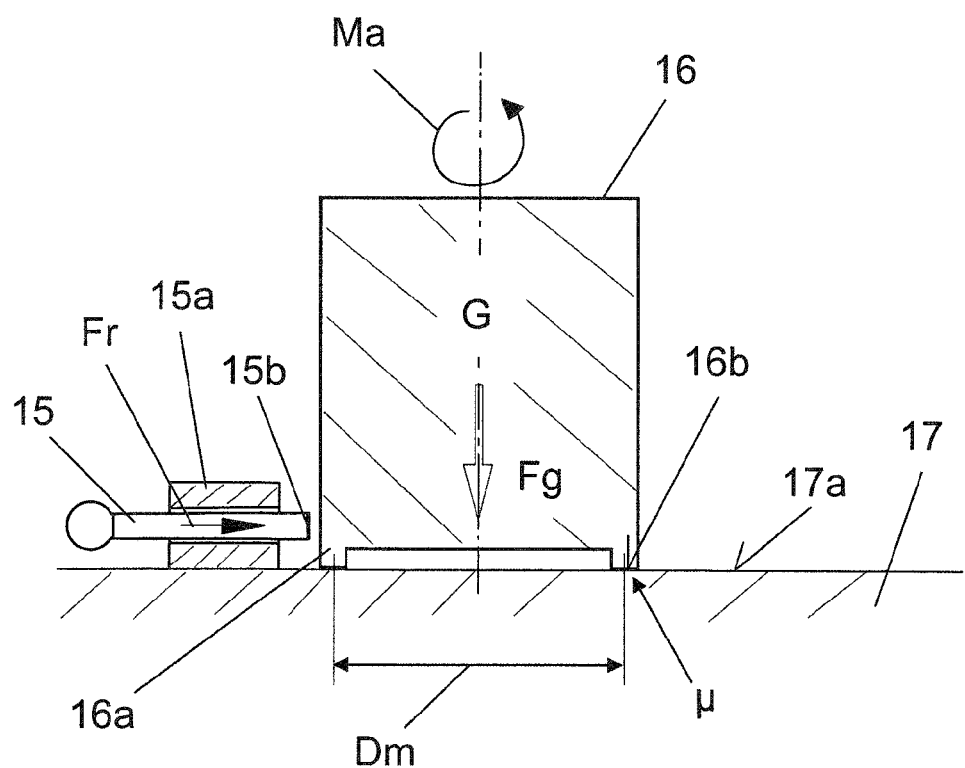
FIG. 4 is a schematic illustration of a test setup.

By means of the test setup according to FIG. 4, the process of friction loss in the case of a forced transverse movement can be explained.

A cylindrical body 16 with a weight G stands by way of an annular surface 16a of an annular portion 16 projecting downward axially from the underside of the cylindrical body 16 on a smooth, level support 17. The annular surface 16a has a mean diameter Dm. At an interface between the annular surface 16a and the supporting surfaceway 17a, there is a coefficient of friction μ. A torque Ma acts about the vertical axis of the cylindrical body 16. A gravitational force Fg gives rise to a holding torque Mh by means of the friction at the interface, being obtained as follows:

$$Mh=Fg*\mu*Dm/2$$

The body turns when the condition Ma>Mh is satisfied, i.e. the cylindrical body 16 must be driven in rotation with a torque Ma greater than the holding torque Mh.

Apart from the cylindrical body 16, there is a tappet 15 arranged movably in a mount 15a on the support 17. The tappet 15 has an end facing the cylindrical body 16 with a contact portion 15b.

A linear transverse movement of the cylindrical body 16 is then enforced by means of the tappet 15. The transverse movement takes place at right angles to the vertical axis of the cylindrical body 16. During this process, the tappet 15 comes into contact, via its contact portion 15b, with the outer surface of the cylindrical body 16 just above the region of the annular portion 16a by means of a preloading force Fr acting in the longitudinal direction of the tappet 15. Surprisingly, a rotary motion of the cylindrical body 16 about the vertical axis thereof is detected during the phase of this transverse movement, even if the condition Ma>Mh is not satisfied, namely if Ma<Mh.

Owing to the enforced movement of the cylindrical body 16 in a direction at right angles to the vertical axis thereof, the friction at the interface between the annular surface 16a and the supporting surface 17a is overcome for any other direction of movement.

Known results of this effect are, for example, the loosening of bolts and the loss of cornering stability when the vehicle wheel is locked.

The annular surface of the body can be regarded as a thread turn of a screwed joint. The acting axial force (Fg) is the loading force of the screw. The loading force gives rise to an oblique downward force at the thread flanks owing to the thread slope and hence, in turn, to a torque which acts in the direction of release. Enforced transverse movements of bolt and/or nut threads can then cause loosening of the screwed joint since, as described above, the friction at the thread flanks is overcome in the tangential direction as well owing to the enforced transverse movement.

This effect is now used in the wear adjustment device 10 according to the invention in order to bring about a reverse adjustment at the threaded tubes 6, 6' of the wear adjustment device 10 of the disc brake 1 in order to increase the release clearance.

Figure 5:
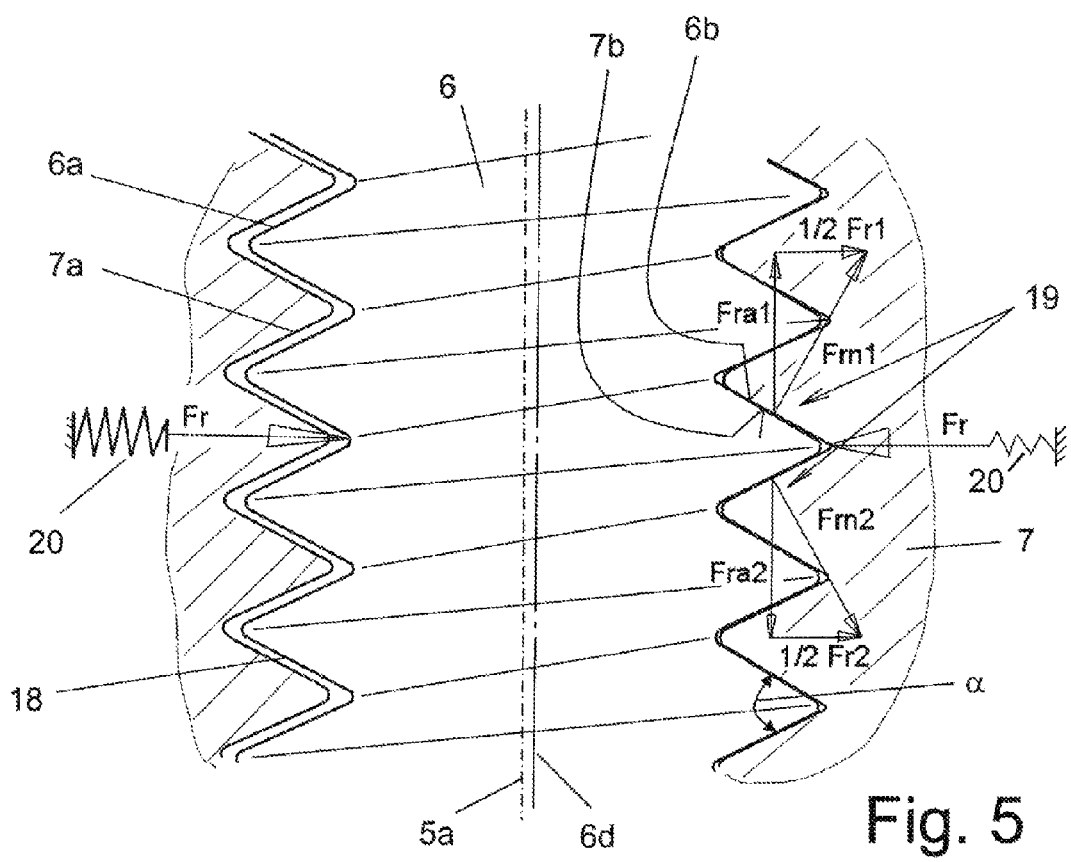
FIG. 5 is a schematic sectional view of a thread segment of a bridge of the disc brake according to FIG. 1.

A schematic sectional view of a thread segment of the bridge 7 of the disc brake 1 according to FIG. 1 is shown in FIG. 5.

The region of the bridge 7 having the threaded tube 6 of spindle unit 5 is shown. Of course, as may easily be understood, the following description also applies to the other region of the bridge 7 having the threaded tube 6' of spindle unit 5'.

Threaded tube 6 has a threaded tube longitudinal axis 6d. The bridge 7 has the internal thread 7a (nut thread) for the external thread 6a of threaded tube 6, which is screwed by means of its external thread 6a into the associated internal thread 7a.

During brake actuation, movements of the external thread 6a of threaded tube 6 relative to the internal thread 7a of the bridge 7 result, for example, from the movement profile of the bridge 7 or from movements of the brake pads 3 when pressure piece 6c is brought into contact (FIG. 1) etc., and, in the case of a non-centrically situated external thread 6a, owing to the centering motion of the external thread 6a of threaded tube 6 in the internal thread 7a of the bridge 7 during force buildup (not present in the case of flat threads). However, these relative movements tend to be random and, where applicable, dependent on the installation position of the disc brake 1 and other boundary conditions.

A particular advantage of the disc brake 1 according to the invention having the wear adjustment device 10 according to the invention is that of bringing about the necessary transverse motion substantially at right angles to the threaded tube longitudinal axis 6d during actuation of the disc brake 1 in a selective and automatic way by use of an elastic lateral loading of the external thread 6a of threaded tube 6 with respect to the internal thread 7a in the bridge 7. By way of this measure, the opposing requirements for a low reverse rotation resistance in the application phase and a high holding torque for securing against vibration during free travel are met.

To influence the flank position of the external thread 6a of threaded tube 6 (and, of course, also correspondingly external thread 6'a of threaded tube 6') for selective cancellation of the friction between the external thread 6a of threaded tube 6 and the internal thread 7a of the bridge 7, the wear adjustment device 10 has at least one preloading arrangement 20.

The preloading arrangement 20 produces the preloading force Fr in a radial direction on threaded tube 6 substantially at right angles to the threaded tube longitudinal axis 6d of threaded tube 6. The preloading arrangement 20 can have an energy storage element designed as a compression spring, for example. Of course, other embodiments are also possible. The preloading arrangement 20 interacts with the opposite external thread segment of threaded tube 6, e.g. by means of a sliding and/or ball bearing arrangement designed as an externally threaded segment of threaded tube 6.

In this way, threaded tube 6 is pressed unilaterally into the internal thread 7a of the bridge 7 by the elastic radial force of the preloading arrangement 20 acting laterally on threaded tube 6, with the result that the entire thread backlash 18 is formed on the opposite side therefrom. In this position, threaded tube 6 is in a rest position. At the beginning of braking, loading force transmission takes place initially only in that region of the external thread 6a of threaded tube 6 which rests against the internal thread 7a.

In this case, the threaded tube longitudinal axis 6d is offset at a distance in parallel to the adjuster axis 5a, which simultaneously forms the center line of the internal thread 7a. In the case shown in FIG. 5, the thread backlash 18 of the thread pairing of the external thread 6a of threaded tube 6 and the internal thread 7a of the bridge 7 is arranged on the side on which the preloading arrangement 20 is situated.

On the opposite side (this is the right-hand side in FIG. 5), contact zones 19 are formed between external thread surfaces 6b of the external thread 6a of threaded tube 6 and internal thread surfaces 7b of the internal thread 7a of the bridge 7.

Since the thread flanks 6a, 7a are wedge-shaped in sectional profile, the contact force produced by the elastic loading at the thread flanks 6a, 7a and hence the frictional force produced can be additionally influenced by a flank angle α. Satisfactory results can already be achieved by use of the flank angle α of a metric thread of 60°. However, smaller flank angles α can advantageously be used since higher frictional holding torques can thereby be achieved for the same radial loading. Nevertheless, the intended effect, described below, of automatic release of the loading also imposes a lower limit on the flank angle α that can be used.

If the loading force acting in an axial direction on threaded tube 6 is then applied by the pivoted brake lever 9 (FIG. 1), this force acts on the thread flanks 6a, 7a on only one side, namely in the contact region 19, and a radially inward-directed oblique downward force arises in the thread flanks 6a, 7a of the contact region owing to the flank angle α (in this connection, normal forces Frn1, Frn2 at the thread flanks 6a, 7a are indicated in FIG. 5 as force triangles with the oblique downward forces split into components comprising radial forces Fr1, Fr2 and axial forces Fra1, Fra2 in the contact region 19), which causes sliding of the thread flanks 6a, 7a and hence movement of threaded tube 6 relative to the center line of the internal thread of the bridge 7 (here relative to the adjuster axis 5a), with the result that the threaded tube longitudinal axis 6d is in alignment with the adjuster axis 5a. During this process, this centering effect causes threaded tube 6 to slide into its central position against the radially acting elastic preloading force Fr and thus also brings the thread flanks 6a, 7a on the opposite side into contact. Threaded tube 6 is thus in a reverse rotation position.

For example, the flank angle α should be at least 30°, assuming a friction coefficient of μ=0.15 in the contact region 19 of the thread flanks 6a, 7a, in order to achieve reliable sliding. At a flank angle of α=60° of the metric thread, the oblique downward force already considerably exceeds the frictional force.

In this phase of the radially inward sliding of threaded tube 6 by virtue of the slope of the threaded flanks 6a, 7a, the friction at the thread flanks 6a, 7a is also overcome in the tangential direction, as a result of which the reverse rotation torque brought about by means of the increasing loading force Fr owing to the thread slope overcomes the frictional resistance and brings about a reverse rotation of threaded tube 6 during the radial sliding phase of said tube.

The particular advantage of this solution is that, given an appropriate flank angle α of the threaded tubes 6, 6', a high holding torque can be achieved at the threaded tubes 6, 6' by means of a relatively small radial load in the unactuated state of the disc brake 1, and this holding torque is automatically eliminated by the "flank sliding effect" when the disc brake 1 is actuated.

Thus, the head friction torque provided on the adjusting arrangement 8 can be reduced, thereby ensuring a satisfactory reverse rotation effect of the threaded tubes 6, 6' combined with a high robustness and vibration stability of the wear adjustment device 10.

Another notable advantage is that the threaded tubes 6, 6' are held in a stable rest position in the unactuated state of the disc brake 1, even under severe vibrational loading, owing to the lateral pressure of the external threads 6a, 6'a of the threaded tubes 6, 6' against the respective internal threads 7a, 7'a of the bridge 7, and hence relative movements of the external threads 6a, 6'a of the threaded tubes 6, 6' against the internal threads 7a, 7'a of the bridge 7, which can cause unwanted changes in the release clearance, are avoided.

To meet the conflicting requirements to enable a reverse rotary motion, on the one hand, and adequate vibration resistance, on the other hand, the above-described following measures are provided as alternatives or in combination:

Influencing of the flank position of the external thread 6a, 6'a and the internal thread 7a, 7'a in the unloaded state by means of the radially acting elastic preloading force Fr of the preloading arrangement 20, 20' to ensure a reliable rest position of the threaded tubes 6, 6' in the bridge 7 under vibrational loading.

To achieve the radial preloading force Fr of the preloading arrangement 20, 20', use, where appropriate, of a spring element which acts on the threaded tubes 6, 6' and, during transverse movements of the threaded tubes 6, 6', applies a friction torque acting in a direction of reverse rotation on the threaded tubes 6, 6' to additionally increase the reverse rotation force.

A release mechanism, which reduces the holding forces at the threaded tube(s) 6, 6' to reduce reverse rotation resistances, using the measures described during the application process of the disc brake 1.

For example, the release mechanism can be constructed in such a way that the threaded tube 6, 6' can be acted upon from both sides by a preloading force Fr, wherein these preloading forces Fr are configured in such a way that the holding forces at the threaded tube(s) 6, 6' are reduced in order, on the one hand, to set the reliable rest position of the flank position of the thread pairing of the external thread 6a, 6'a and the internal thread 7a, 7'a when the disc brake 1 is released (by the first preloading arrangement 20, on the left side of spindle 6 in FIG. 5) and, on the other hand, in order to set the reverse rotation position during the application process of the brake pads 3 (by a second preloading arrangement 20, on the right side of spindle 6 in FIG. 5).

The wear adjustment device 10 is primarily designed for wear adjustment of pneumatically applied disc brakes 1 in the commercial vehicle sector. However, it can also be used in all other applications where wear adjustment is necessary.

The illustrative embodiments described above do not restrict the invention. It can be modified within the scope of the attached claims.

Thus, for example, the preloading arrangement 20, 20' can be pneumatically, hydraulically and/or electrically actuable.

It is contemplated for the threaded tube longitudinal axis 6d to be pivoted at an angle other than zero relative to the adjuster axis 5a.

LIST OF REFERENCE SIGNS 1 disc brake
2 brake disc
2a brake disc axis
3 brake pad
3a brake pad support
4 brake caliper
5, 5' spindle unit
5a adjuster axis
5'a driver axis
6, 6' threaded tube
6a, 6'a external thread
6b external thread surface
6c, 6'c pressure piece
6d threaded tube longitudinal axis
7 bridge
7a internal thread
7b internal thread surface
8 adjusting arrangement
8' driver
8a driving element
8b freewheeling and overload clutch arrangement
8c adjuster axis 8d sleeve
8e adjuster output element
8f coupling element
8g driving portion
9 pivoted brake lever
9a actuator
10 wear adjustment device
11 synchronization unit
11a, 11'a synchronizing wheel
11b synchronizing means
12 drive
13 return spring
14 selector fork
14a driving finger
14'a rest finger
14b, 14'b inner flank
14c fork opening
15 tappet
15a contact portion
15b mount
16 cylindrical body
16a annular portion
16b annular surface
17 support
17a supporting surface
18 thread backlash
19 contact zone
20, 20' preloading arrangement
α flank angle
Dm friction diameter
G weight
Fg gravitational force
Fr preloading force
Fr1, Fr2 radial force
Fra1, Fra2 oblique downward force
Frn1, Frn2 normal force
KLS clearance
L, L' release direction
Ma driving torque
μ friction coefficient
Z, Z' brake application direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a motor vehicle, comprising:
   a brake application device;
   a bridge having an internal thread;
   a spindle unit having a threaded tube with an external thread that cooperates with the internal thread of the bridge;
   a bidirectional wear adjustment device coupled to the brake application device,
   wherein
      the bidirectional wear adjustment device comprises an adjusting arrangement and a preloading arrangement, and
      the preloading arrangement is configured to
         influence a flank position of a thread pairing of the external thread of the threaded tube and the internal thread of the bridge, and
         produce a preloading force that acts radially on the threaded tube.

2. The disc brake according to claim 1, wherein the brake application device has a pivotable brake lever, the pivotable brake lever coupling with the bidirectional wear adjustment device.

3. The disc brake according to claim 1, wherein
   the preloading arrangement is configured to adjust the flank position from a rest position in a state of release of the disc brake into a reverse rotation position with a reduced reverse rotation resistance of the thread pairing during an application process of the disc brake.

4. The disc brake according to claim 1, wherein the preloading force that acts radially on the threaded tube is an elastically acting preloading force.

5. The disc brake according to claim 4, wherein the preloading arrangement comprises an energy storage element that produces the preloading force that acts radially on the threaded tube.

6. The disc brake according to claim 1, wherein the preloading arrangement comprises an energy storage element that produces the preloading force that acts radially on the threaded tube.

7. The disc brake according to claim 5, wherein the energy storage element is a compression spring.

8. The disc brake according to claim 3, wherein:
   the preloading arrangement comprises a release mechanism, and
   the release mechanism is configured to reduce the reverse rotation resistance or holding forces of the thread pairing during the application process of the disc brake in the reverse rotation position.

9. The disc brake according to claim 1, wherein:
   the adjusting arrangement comprises a selector fork connected to a driving element, and
   the selector fork interacts with an actuator of the brake application device.

10. The disc brake according to claim 2, wherein:
    the adjusting arrangement comprises a selector fork connected to a driving element, and
    the selector fork interacts with the pivotable brake lever of the brake application device.

11. The disc brake according to claim 9, wherein the adjusting arrangement comprises a free-wheeling and overload clutch arrangement, the freewheeling and overload clutch arrangement interacting with the driving element.

12. The disc brake according to claim 1, wherein the adjusting arrangement is inserted into the threaded tube of the spindle unit.

13. The disc brake according to claim 1, wherein the adjusting arrangement has a defined head friction torque.

14. The disc brake according to claim 1, further comprising:
    a second spindle unit having a second threaded tube with an external thread that cooperates with a second internal thread of the bridge.

15. The disc brake according to claim 1, wherein the disc brake is a pneumatically actuated disc brake for a commercial vehicle.

16. A bidirectional wear adjustment device for a disc brake of a motor vehicle, in which the disc brake has a bridge with an internal thread that cooperates with an external thread of a threaded tube of a spindle unit, the bidirectional wear adjustment device comprising:

an adjusting arrangement;
a preloading arrangement, wherein
   the preloading arrangement is configured to influence a flank position of a thread pairing of the external thread of the threaded tube and the internal thread of the bridge, and
the preloading arrangement is configured to produce a preloading force that acts radially on the threaded tube.

17. The bidirectional wear adjustment device according to claim 16, wherein the preloading arrangement is configured to adjust the flank position from a rest position in a state of release of the disc brake into a reverse rotation position with a reduced reverse rotation resistance of the thread pairing during an application process of the disc brake.

18. The bidirectional wear adjustment device according to claim 16, wherein the preloading force that acts radially on the threaded tube is an elastically acting preloading force.

* * * * *